April 14, 1970 A. LICHOWSKY 3,505,744

CENTRIFUGAL FORCE CONTROLLED TRANSDUCER

Filed Jan. 25, 1967

INVENTOR
ABRAHAM LICHOWSKY

By Samuel Cohen

Attorney

United States Patent Office 3,505,744
Patented Apr. 14, 1970

3,505,744

CENTRIFUGAL FORCE CONTROLLED TRANSDUCER

Abraham Lichowsky, Los Angeles, Calif., assignor to RCA Corporation, a corporation of Delaware Filed Jan. 25, 1967, Ser. No. 611,653
Int. Cl. G11b 5/52, 5/54, 5/60
U.S. Cl. 340—174.1 4 Claims

ABSTRACT OF THE DISCLOSURE

This disclosure relates to the problem of supporting a transducer, such as a magnetic head, spaced appropriate distances from a recording medium, such as a memory disk, during the time the recording medium is moving and the time it is at rest. The transducer is brought into an air bearing engagement with the recording surface by virtue of centrifugal force acting on a radially extendable rotating transducer support which also moves the transducer toward the recording surface as the rotation and resulting centrifugal force increases.

CROSS REFERENCES

This application is related to application Ser. No. 509,497, filed Nov. 24, 1965 now Patent No. 3,402,403 by the present inventor and assigned to the same assignee as the present application.

BACKGROUND OF THE INVENTION

In the art of recording and reproducing data by means of a transducer, such as a magnetic head, mounted in close proximity to a moving magnetic recording surface, it is important to maintain between the transducer and the recording surface a spacing which is very small and which remains constant during the movement of the recording medium. It is also desirable to avoid, if possible, actual contact between the transducer and recording medium to minimize damage to these components.

It is well known that one way such spacing may be achieved is to employ a layer of a fluid, such as air, which clings to the recording surface as it moves, to support the transducer. This rapidly moving layer of fluid creates a hydrodynamic force which causes the transducer heads to be supported, that is, to "fly" or float at a fixed distance from the recording surface.

Examples in the prior art of the use of techniques such as discussed above are given in Bielski Patent No. 3,158,848 and Cheney Patent No. 3,187,315. In the arrangement of the Bielski patent, a magnetic head mounted on leaf springs initially resiliently engages a magnetic recording drum. As the drum comes up to speed, the air layer which is generated floats the head. When the drum slows down, the head "crash lands" on the drum surface. In the arrangement of the Cheney patent, a magnetic head supported on a leaf spring is normally spaced a substantial distance from the drum surface. When the drum rotates, the biasing force of the spring is overcome by the so-called "Bernoulli force" and the head is drawn toward the drum surface. However, when the head reaches a point very close to the drum surface, the pressure exerted by the thin air film between the head and drum floats the head and prevents it from touching the drum. When the drum slows down, the head self-retracts.

SUMMARY OF THE INVENTION

In the arrangement of the invention, the storage disk is rotatable but, as contrasted to the systems of prior art, the transducer, rather than remaining at a relatively fixed position, is driven along a closed path in a plane parallel to the storage disk. The transducer is resiliently mounted in such manner that when it is at rest, it is spaced a small distance from the disk and when it is driven along its path at its operating speed, by virtue of the centrifugal force acting thereon, the transducer moves toward the disk and then rides on the fluid bearing generated between it and the disk. When the transducer slows down causing the centrifugal force acting thereon to lessen, the transducer is automatically retracted by its resilient supporting structure.

DETAILED DESCRIPTION

The overall system of which the present invention is a part is shown in detail in the copending Lichowsky application mentioned above. The portion of the system shown schematically in FIGURES 1 and 2 of the present application includes a magnetic storage disk 10 which is rotated at high speed by the storage disk drive means shown generally at 12. The transducer, a magnetic read/write head 14, is secured to the end portion of the transducer supporting means which includes arm 16. The latter is rotated in a plane parallel to that of the disk 10 by the magnetic head drive means shown generally at 18. For purposes of the present application, the transducer supporting means is shown to include a relatively narrow arm 16, however, it may also or instead include a disk such as shown in the copending application.

Figure 1:
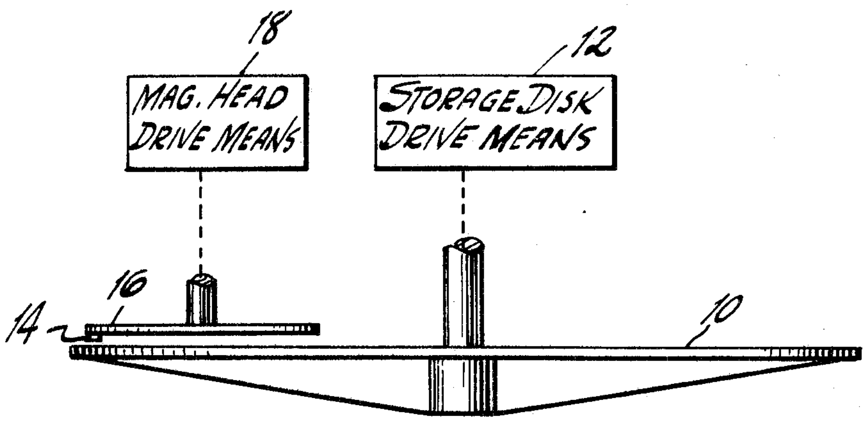
FIGURE 1 is a schematic showing of an arrangement according to the invention.
Figure 2:
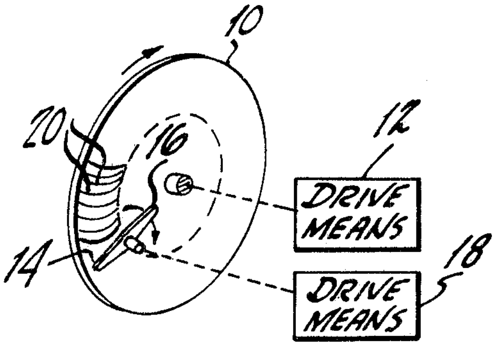
FIGURE 2 is a schematic perspective view of the arrangement of the invention.

During the operation of the system of FIGURES 1 and 2, both the storage disk and the transducer supporting structure rotate. Information is written on and read from the storage disk along curved tracks, some of which are shown at 20, in the manner discussed in the copending application. The disk may also have codes indicative of track addresses recorded along the circumferential edge thereof (not shown in FIGURE 2) as is also discussed in the copending application.

Figure 3:
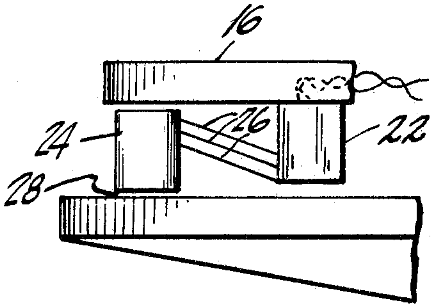
FIGURE 3 is a side view showing the magnetic head structure employed in the arrangements of FIGURES 1 and 2.
Figure 4:
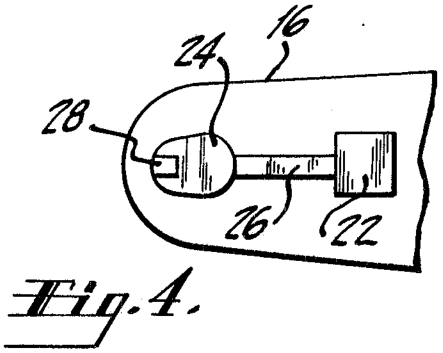
FIGURE 4 is a bottom view of what is shown in FIGURE 3.

The magnetic head mounting arrangement is illustrated in greater detail in FIGURES 3 and 4. The magnetic head assembly consists of a first housing 22 which is fixed to the arm 16 and a second, floating housing 24. The latter is resiliently fixed to the housing 22 by three leaf springs 26. The flux generating and receiving portion 28 of the magnetic head is spaced a relatively small distance, perhaps 0.005 inch from the surface of the disk 10 when the arm 16 is at rest. The three leaf springs 26 are closer to the disk surface at the end portion thereof fixed to the first housing 22 than at the end portion fixed to the second floating housing 24.

When the magnetic head drive means 18 brings the arm 16 up to speed, centrifugal force acts on the floating housing 24. This tends to move the head 24 outwardly, however, in view of the way in which the springs 26 are arranged, a component of this force moves the head 24 down toward the disk surface. During such downward movement, the bottom surface of the housing 24 remains parallel to the disk surface. The floating head 24 never touches the disk surface since when it reaches a distance of about $10^{-4}$ inch from this surface, the thin film of air which is generated supports the head, that is, causes the head to "fly" at a fixed distance from the disk surface. On the other hand, when the arm 16 slows down and the centrifugal force acting on the floating head 24 lessens, the springs 26 automatically retract the head.

The magnetic head of the present system may be enclosed in a housing similar to the one shown in the Bielski patent above. To simplify the drawing, this housing is not shown. In other respects, the magnetic head itself is also similar to that of the Bielski patent, however, the principle of operation of the system of the present invention, that of driving the head along a curved path in a plane parallel to the recording medium and employing centrifugal force to move the head toward the recording surface, is, of course, quite different from that of the Bielski patent or the Cheney patent.

What is claimed is:

1. In combination:

a storage medium having a recording surface;

supporting means capable of being driven in a circular path lying in a plane parallel and adjacent to said recording surface;

transducer means having one surface adapted to ride on a fluid bearing;

a resilient element radially extending from said supporting means and secured at one end to said transducer means at a point sufficiently further from said recording surface than that at which it is secured at its other end to said supporting means, and said transducer means, in its rest position, lying with said one surface sufficiently close to said recording surface, that when said supporting means is driven along its circular path at sufficiently high speed, centrifugal force alone tends to cause said transducer means to strike said recording surface and a fluid bearing is created between said recording surface and transducer means which tends to counteract this tendency; and means for driving said supporting means at a speed such that said transducer means rides in an equilibrium position spaced by a fluid bearing from the recording surface at which the component of centrifugal force tending to cause said transducer means to strike said recording surface is cancelled by the force exerted by the fluid bearing created between the transducer means and the recording surface.

2. In the combination as set forth in claim 1, said storage medium comprising a continuously rotating disc.

3. In the combination as set forth in claim 1, said resilient element comprising a plurality of springs arranged parallel to one another and lying one above the other relative to said recording surface.

4. In the combination as set forth in claim 1, said fluid bearing comprising an air bearing.

References Cited

Eastwood, D. E.: "Stacked Disk Recorder," June 1961, p. 12, vol. 4, No. 1, IBM Technical Disclosure Bulletin.

Cronquist, D. H.: Rotating Recording Head; August 1961, IBM Tech. Disc. Bull., p. 12, vol. 4, No. 3.

BERNARD KONICK, Examiner

W. F. WHITE, Assistant Examiner

U.S. Cl. X.R.

179—100.2